(12) United States Patent
Chuang

(10) Patent No.: US 12,157,997 B2
(45) Date of Patent: Dec. 3, 2024

(54) SHOCK ABSORBING EQUIPMENT HAVING SHEAR-WALL-LIKE MECHANISM WITH ENHANCED DAMPING FORCE FOR A BUILDING AND SHOCK ABSORBING SYSTEM WITH THE SAME

(71) Applicant: Hsun-Jen Chuang, Taipei (TW)

(72) Inventor: Kuo-Jung Chuang, Taipei (TW)

(73) Assignee: Hsun-Jen Chuang, Taipei (TW)

( * ) Notice: Subject to any disclaimer, the term of this patent is extended or adjusted under 35 U.S.C. 154(b) by 186 days.

(21) Appl. No.: 18/152,267

(22) Filed: Jan. 10, 2023

(65) Prior Publication Data

US 2024/0026678 A1    Jan. 25, 2024

(30) Foreign Application Priority Data

Jul. 21, 2022  (TW) .................................. 111127426

(51) Int. Cl.
*E04B 1/98*  (2006.01)
*F16F 9/14*  (2006.01)

(52) U.S. Cl.
CPC ................ *E04B 1/98* (2013.01); *F16F 9/145* (2013.01)

(58) Field of Classification Search
CPC ........... E04B 1/98; F16F 9/145; E04H 9/0237
See application file for complete search history.

(56) References Cited

U.S. PATENT DOCUMENTS

| 6,223,483 B1* | 5/2001 | Tsukagoshi | ........... E04H 9/0237 52/167.7 |
| 6,672,573 B2* | 1/2004 | Berton | ................... E04H 9/0235 267/136 |
| 8,677,699 B2* | 3/2014 | Tagawa | .................. E04H 9/0237 188/380 |
| 9,580,924 B1* | 2/2017 | Taylor | ..................... E04H 9/028 |
| 11,447,949 B2* | 9/2022 | Honarbakhsh | ........ E04H 9/0235 |
| 11,754,140 B2* | 9/2023 | Fu | .......................... E04H 9/0237 188/267 |
| 11,808,026 B2* | 11/2023 | Zhao | ...................... E04B 1/2403 |

(Continued)

FOREIGN PATENT DOCUMENTS

| CN | 205421566 U | 8/2016 |
| CN | 212026692 U | 11/2020 |

(Continued)

*Primary Examiner* — Rodney Mintz
(74) *Attorney, Agent, or Firm* — Best & Flanagan LLP

(57) ABSTRACT

A shock absorbing equipment having shear-wall-like mechanism with enhanced damping force for a building includes a longitudinal transmission rod, an upper dampers, and a lower dampers. The two upper dampers are mounted on the upper half wall. Two ends of each of the upper dampers is connected to the upper end of the longitudinal transmission rod and the upper half wall. The two lower dampers are mounted on the lower half wall. Two ends of each of the lower dampers is connected to the lower end of the longitudinal transmission rod and the lower half wall. The shock absorbing equipment sensitively amplifies a displacement between the floors caused by earthquake, so as to early dissipate seismic energy. Moreover, the needed number of the shock absorbing equipment for the building can also be reduced and impact on traffic flow and ambient lighting in the building can be reduced.

7 Claims, 4 Drawing Sheets

(56) References Cited

U.S. PATENT DOCUMENTS

| | | | | |
|---|---|---|---|---|
| 2001/0054785 | A1* | 12/2001 | Berton | E04H 9/0237 |
| | | | | 267/136 |
| 2012/0038091 | A1* | 2/2012 | Tagawa | E04H 9/0237 |
| | | | | 267/136 |
| 2016/0138263 | A1* | 5/2016 | Koyama | F16F 15/02 |
| | | | | 52/167.1 |
| 2021/0148434 | A1* | 5/2021 | Fu | F16F 15/035 |
| 2021/0164223 | A1* | 6/2021 | Honarbakhsh | E04B 1/98 |
| 2022/0154445 | A1* | 5/2022 | Zhao | E04H 9/024 |

FOREIGN PATENT DOCUMENTS

| | | |
|---|---|---|
| CN | 112982730 A | 6/2021 |
| CN | 113700160 A | 11/2021 |

\* cited by examiner

SHOCK ABSORBING EQUIPMENT HAVING SHEAR-WALL-LIKE MECHANISM WITH ENHANCED DAMPING FORCE FOR A BUILDING AND SHOCK ABSORBING SYSTEM WITH THE SAME

BACKGROUND OF THE INVENTION

1. Field of the Invention

The present invention relates to a shock absorbing equipment for a building and a shock absorbing system with the same, especially to a shock absorbing equipment that is installed between columns and beams of a building, so as to reduce vibration when the building withstands external forces caused by earthquakes and to reduce damage to the building.

2. Description of the Prior Art(s)

In addition to damage a structure of a building, vibration on a building caused by earthquake also causes the building to collapse, which endanger the safeties of lives and properties of the residents of the building. In order to allow the building having better resistance to the earthquake, a frame structure of the building should be enhanced and shock absorbing devices can also be installed between beams and columns of the frame structure. In this way, seismic energy causing the building to vibrate can be absorbed and excessive structural deformation of the building can be prevented, such that the vibration of the building and the damage to the building caused by the earthquake can be reduced.

With reference to FIG. 3, a conventional shock absorbing device of a building is mounted to and between an upper beam-column connection 51 and a lower beam-column connection 52. The upper beam-column connection 51 and the lower beam-column connection 52 are respectively disposed on an upper floor and a lower floor of a building. Said conventional shock absorbing device includes a damper 40. The damper 40 has two opposite ends pivotally connected to the upper beam-column connection 51 and the lower beam-column connection 52 respectively. When an earthquake occurs and the building vibrates, the upper beam-column connection 51 and the lower beam-column connection 52 also vibrate transversely. The damper 40 is extended or shortened accordingly, so as to absorb part of seismic energy that causes the building to vibrate and achieve the effect of shock absorption.

However, in the conventional shock absorbing device as shown in FIG. 3, the damper 40 is set obliquely while being connected to the upper beam-column connection 51 on the upper floor and the lower beam-column connection 52 on the lower floor. Therefore, an effective damping force acting on the building to prevent the building from vibrating transversely is only a horizontal component force (F×cos θ) of an axial damping force (F) generated by the damper 40. Said axial damping force is generated while the damper 40 is stretched or compressed and is parallel with a stretching and compression direction of the damper 40. As described above, the axial damping force is unable to be fully used to stop vibration of the building. Thus the damper 40 can only absorb a limit amount of the seismic energy that is exerted on the building and it is difficult to further improve an efficacy of the damper 40 in absorbing the seismic energy.

With further reference to FIG. 4, another conventional shock absorbing device of a building is shown and is also mounted between an upper floor 71 and a lower floor 72 of the building. Two upper beam-column connections 711 are mounted on the upper floor 71 and are disposed adjacent to two structural columns 73 respectively. A connecting connection 722 is mounted on the upper floor 71 and is disposed between the two upper beam-column connections 711. Two lower beam-column connections 721 are mounted on the lower floor 72 and are disposed adjacent to the two structural columns 73 respectively. Said conventional shock absorbing device includes two steel bracing frames 61 and two dampers 62.

Each of the two steel bracing frames 61 has an upper end and a lower end. The lower ends of the two steel bracing frames 61 are connected to the two lower beam-column connections 721 respectively and the upper ends of the two steel bracing frames 61 are connected to the connecting connection 722. The two steel bracing frames 61 along with the lower floor 72 form a firm structure. The two dampers 62 are horizontally disposed between the connecting connection 722 and a left one of the upper beam-column connections 711 and between the connecting connection 722 and a right one of the upper beam-column connections 711 respectively. Two ends of each of the dampers 62 are pivotally connected to the connecting connection 722 and a respective one of upper beam-column connections 711 respectively. Since the two dampers 62 are placed horizontally, damping forces of the two dampers 62 can be fully used to stop vibration of the building. Therefore, the shock absorbing device shown in FIG. 4 has better vibration damping effect than the shock absorbing device shown in FIG. 3.

However, the problem of the conventional shock absorbing device shown in FIG. 4 is that the user has to install a plurality of said conventional shock absorbing devices, each of which includes two dampers 62, between floors of the building. Consequently, traffic flow and ambient lighting in the building would be influenced and it would cost a lot in installing said conventional shock absorbing devices, which are not economical.

To overcome the shortcomings, the present invention provides a shock absorbing equipment having shear-wall-like mechanism with enhanced damping force for a building to mitigate or obviate the aforementioned problems.

SUMMARY OF THE INVENTION

The main objective of the present invention is to provide a shock absorbing equipment having shear-wall-like mechanism with enhanced damping force for a building. The shock absorbing equipment is configured to be installed between an upper beam and a lower beam. An upper half wall extends down from the upper beam and a lower half wall extends up from the lower beam. The shock absorbing equipment includes a longitudinal transmission rod, two upper dampers, and two lower dampers.

The longitudinal transmission rod extends between the upper beam and the lower beam, is able to swing leftward and rightward, and has an upper end, a lower end, a first pivoting portion pivotally connected with the upper half wall, and a second pivoting portion pivotally connected with the lower half wall.

The two upper dampers are mounted on the upper half wall and disposed adjacent to the upper beam. The upper end of the longitudinal transmission rod is disposed between the two upper dampers. Each of the upper dampers has two opposite ends. One of the ends of each of the upper dampers is connected to the upper half wall at a position that is close to the upper beam and an adjacent column and the other end of each of the upper dampers is connected to the upper end of the longitudinal transmission rod.

The two lower dampers are mounted on the lower half wall and disposed adjacent to the lower beam. The lower end of the longitudinal transmission rod is disposed between the two lower dampers. Each of the lower dampers has two opposite ends. One of the ends of each of the lower dampers is connected to the lower half wall at a position that is close to the lower beam and an adjacent column and the other end of each of the lower dampers is connected to the lower end of the longitudinal transmission rod.

The main objective of the present invention is to provide a shock absorbing system that comprises two said shock absorbing equipments. One of the two shock absorbing equipments is installed on a first side surfaces of the upper half wall and the lower half wall with the two upper dampers of said shock absorbing equipment placed on the first side surface of the upper half wall and the two lower dampers of said shock absorbing equipment placed on the first side surface of the lower half wall. The first side surface of the lower half wall and the first side surface of the upper half wall face toward a same direction. The other one of the two shock absorbing equipments is installed on the second side surfaces of the upper half wall and the lower half wall with the two upper dampers of said shock absorbing equipment placed on the second side surface of the upper half wall and the two lower dampers of said shock absorbing equipment placed on the second side surface of the lower half wall. The second side surface of the lower half wall and the second side surface of the upper half wall face toward a same direction.

With the upper dampers and the lower dampers that are horizontally set on the building, a displacement between the floors is able to be sensitively amplified by three to five times through the principle of leverage. Thus, the upper and lower dampers absorb destructive seismic energy at the same time. Since the upper dampers and the lower dampers are all horizontally set, the damping force generated by the upper and lower dampers can be fully used to stop vibration of the building, so that the shock absorbing equipment for the building of the present invention has a good shock absorbing effect. Furthermore, since configuration of the shock absorbing equipment is compact, maintenance of the shock absorbing equipment is easy and the impact on traffic flow and ambient lighting in the building can be reduced.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
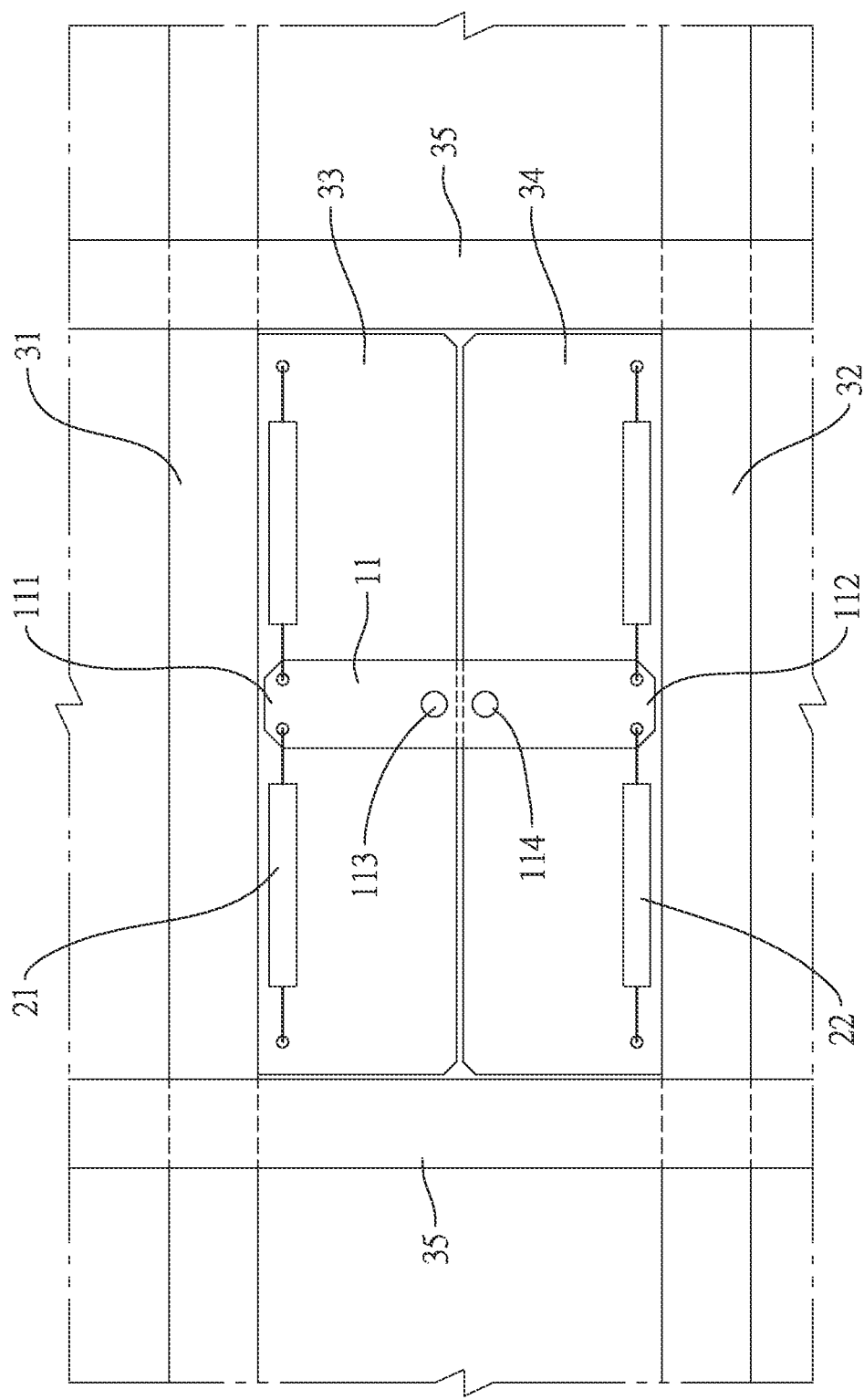
FIG. 1 is a front schematic view of a shock absorbing equipment having shear-wall-like mechanism with enhanced damping force for a building in accordance with the present invention.

With reference to FIG. 1, a shock absorbing equipment having shear-wall-like mechanism with enhanced damping force for a building in accordance with the present invention is configured to be installed between floors in the building. The building has an upper floor and a lower floor disposed adjacent to each other. An upper beam 31 is disposed on the upper floor and an upper half wall 33 extends down from the upper beam 31. The upper half wall 33 is a reinforced concrete (RC) wall with a height being half of a height defined between the upper floor and the lower floor. A lower beam 32 is disposed on the lower floor and a lower half wall 34 extends up from the lower beam 32. The lower half wall 34 is also RC wall being independent from the upper half wall 33 and with a height being half of the height defined between the upper floor and the lower floor. The shock absorbing equipment comprises a longitudinal transmission rod 11, two upper dampers 21 and two lower dampers 22.

The longitudinal transmission rod 11 is a steel plate shear transmission rod, extends between the upper beam 31 and the lower beam 32, and is able to swing leftward and rightward. The longitudinal transmission rod 11 has an upper end 111, a lower end 112, a first pivoting portion 113, and a second pivoting portion 114. The upper end 111 of the longitudinal transmission rod 11 extends toward the upper beam 31. The lower end 112 of the longitudinal transmission rod 11 extends toward the lower beam 32. The first pivoting portion 113 and the second pivoting portion 114 are separately defined on the longitudinal transmission rod 11 and between the upper end 111 and the lower end 112 of the longitudinal transmission rod 11. The first pivoting portion 113 is pivotally connected with the upper half wall 33 and the second pivoting portion 114 is pivotally connected with the lower half wall 34.

The two upper dampers 21 are mounted on the upper half wall 33 and are disposed adjacent to the upper beam 31. The upper end 111 of the longitudinal transmission rod 11 is disposed between the two upper dampers 21. Each of the upper dampers 21 extends horizontally and has two opposite ends. One of the ends of each of the upper dampers 21 is connected to the upper half wall 33 at a position that is close to the upper beam 31 and an adjacent column 35. The other end of each of the upper dampers 21 is connected to the upper end 111 of the longitudinal transmission rod 11. In the preferred embodiment as shown in the drawings, the two upper dampers 21 are placed on a same side of the upper half wall 33.

The two lower dampers 22 are mounted on the upper half wall 34 and are disposed adjacent to the lower beam 32. The lower end 112 of the longitudinal transmission rod 11 is disposed between the two lower dampers 22. Each of the lower dampers 22 extends horizontally and has two opposite ends. One of the ends of each of the lower dampers 22 is connected to the lower half wall 34 at a position that is close to the lower beam 32 and an adjacent column 35. The other end of each of the lower dampers 22 is connected to the lower end 112 of the longitudinal transmission rod 11. In the preferred embodiment as shown in the drawings, the two lower dampers 22 are placed on a same side of the lower half wall 34.

Specifically, the upper dampers 21 and the lower dampers 22 in the preferred embodiment are, but are not limited to, oil dampers. The upper dampers 21 and the lower dampers 22 may be any devices, such as viscoelastic dampers, that are able to buffer vibration and absorb kinetic energy.

A shock absorbing system in accordance with the present invention comprises two shock absorbing equipments as described. The upper half wall 33 has a first side surface and a second side surface oppositely defined on the upper half wall 33. The lower half wall 34 also has a first side surface and a second side surface oppositely defined on the lower half wall 34. The first side surface of the lower half wall 34 and the first side surface of the upper half wall 33 face toward a same direction. The second side surface of the lower half wall 34 and the second side surface of the upper half wall 33 face toward a same direction. One of the two shock absorbing equipments is installed on the first side surfaces of the upper half wall 33 and the lower half wall 34 with the two upper dampers 21 of said shock absorbing equipment placed on the first side surface of the upper half wall 33 and the two lower dampers 22 of said shock absorbing equipment placed on the first side surface of the lower half wall 34. The other one of the two shock absorbing equipments is installed on the second side surfaces of the upper half wall 33 and the lower half wall 34 with the two upper dampers 21 of said shock absorbing equipment placed on the second side surface of the upper half wall 33 and the two lower dampers 22 of said shock absorbing equipment placed on the second side surface of the lower half wall 34.

Figure 2:
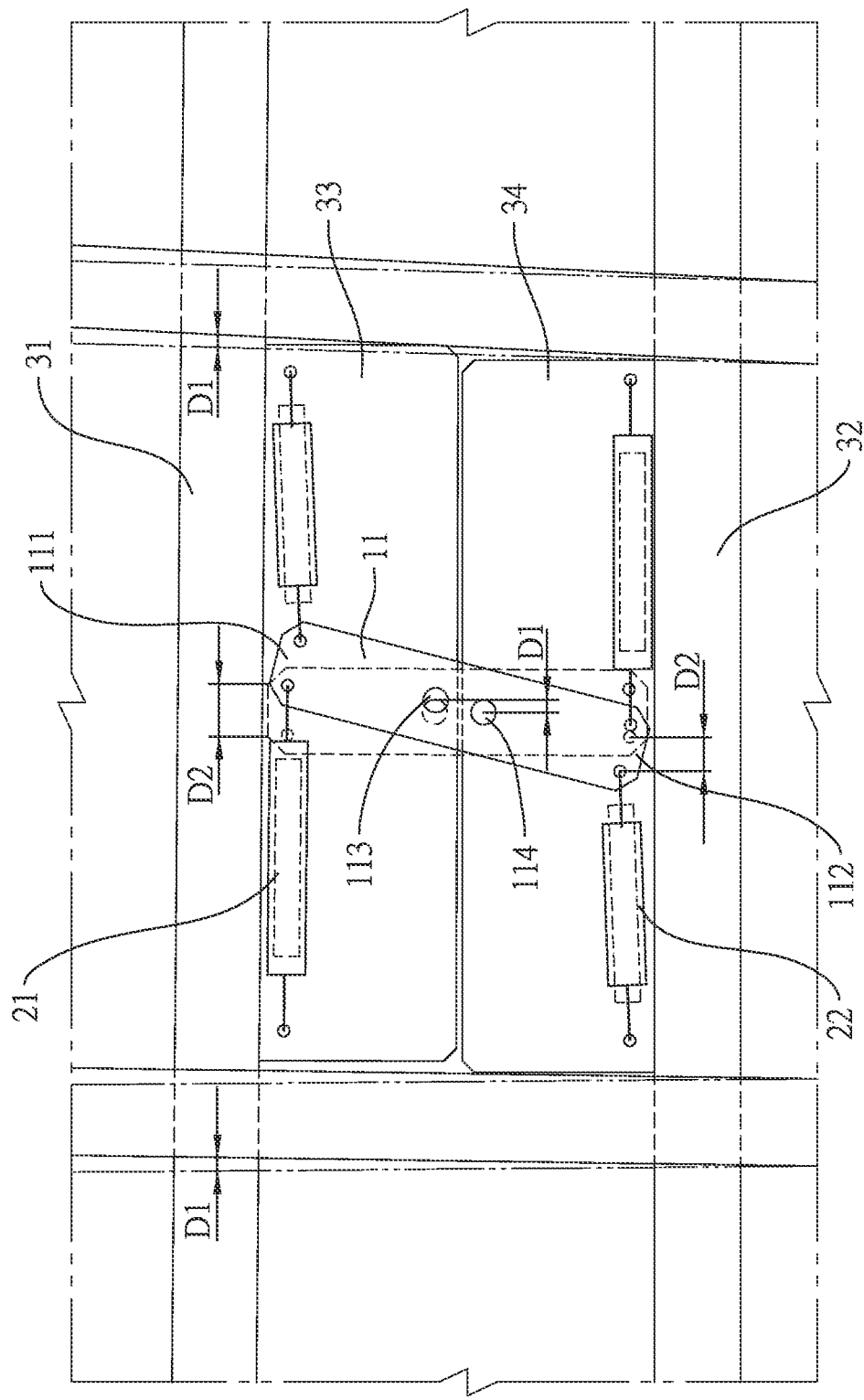
FIG. 2 is an operation front schematic view of the shock absorbing equipment for the building in FIG. 1.
Figure 3:
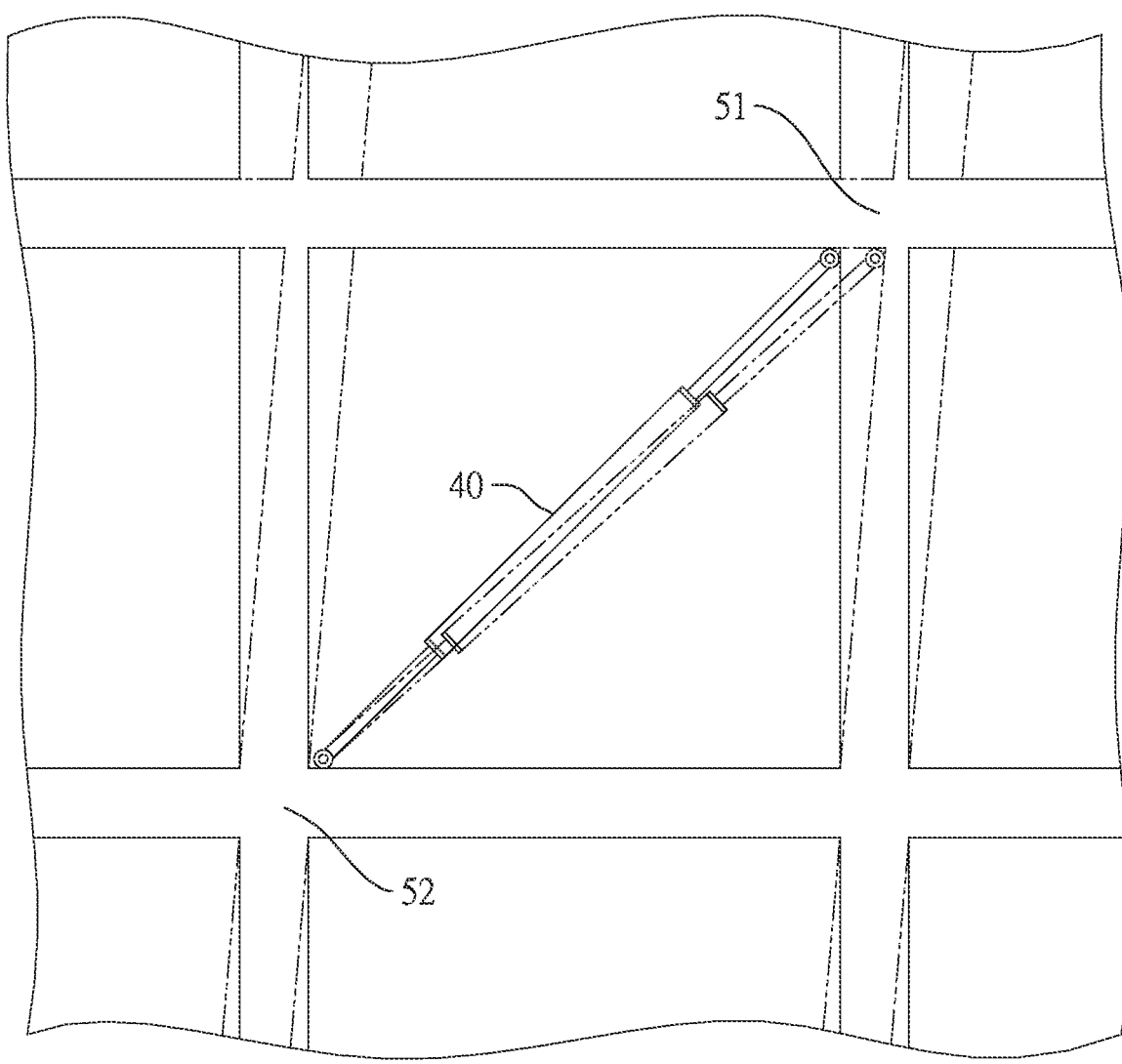
FIG. 3 is a front schematic view of a conventional shock absorbing equipment for a building in accordance with the prior art.
Figure 4:
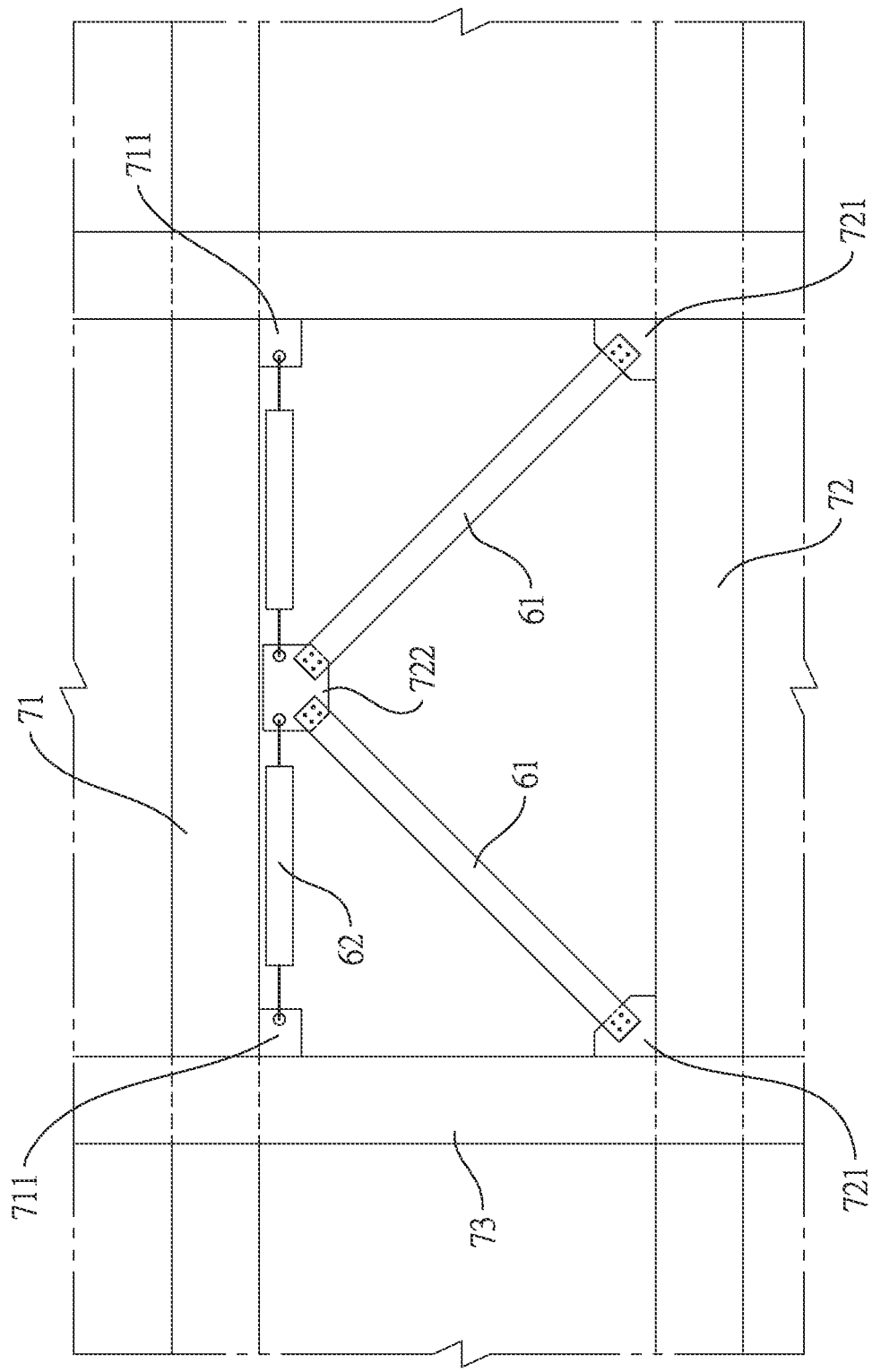
FIG. 4 is a front schematic view of another conventional shock absorbing equipment for a building in accordance with the prior art.

With reference to FIGS. 1 and 2, when earthquake occurs and the building vibrates, the upper floor and the lower floor transversely move back and forth. The longitudinally transmission rod 11 that is moved along with the upper beam 13 as well as the upper half wall 33 and the lower 32 as well as the lower half wall 34 becomes extending obliquely. For the time being, one of the upper dampers 21 is stretched and lengthened and the other upper damper 21 is compressed and shortened while one of the lower dampers 22 is stretched and lengthened and the other lower damper 22 is compressed and shortened.

In the shock absorbing equipment for the building of the present invention, with the upper dampers 21 and the lower dampers 22 that are horizontally set on the building, a displacement D1 between the floors is able to be sensitively amplified by three to five times through the principle of leverage, as shown by a displacement D2 of the upper or lower end 111, 112 of the longitudinal transmission rod 11. Thus, the upper and lower dampers 21, 22 absorb destructive seismic energy at the same time. Since the upper dampers 21 and the lower dampers 22 are all horizontally set, the damping force generated by the upper and lower dampers 21, 22 can be fully used to stop the vibration of the building, so that the shock absorbing equipment for the building of the present invention has a good shock absorbing effect.

Therefore, in addition to suppress damage from the earthquake and reduce the vibration of the building, the needed number of the shock absorbing equipment for the building can also be reduced, which is very helpful for reducing the impact on traffic flow and ambient lighting in the building.

Moreover, generally, if there are traditional shear walls between the upper and lower floors, the shear walls can reduce relative displacement between the upper and lower floors when the earthquake occurs. However, said traditional shear walls are unable to dissipate the seismic energy. Thus, without the shear walls between the upper and lower floors, the building would vibrate for a longer time when the earthquake occurs.

With the shock absorbing equipment for the building of the present invention, the upper half wall 33 and the lower half wall 34, which are originally the shear walls being unable to dissipate the seismic energy, can become the shear walls with enhanced damping force. Thus, the shock absorbing equipment is able to suppress displacement of the building and shortens duration of the vibration of the building when the earthquake occurs. Furthermore, since configuration of the shock absorbing equipment is compact, maintenance of the shock absorbing equipment is easy and the impact on the traffic flow and the ambient lighting in the building can be reduced.

Specifically, in the preferred embodiment, there is one shock absorbing equipment mounted to one side of each of the upper and lower half walls 33, 34. However, it is not limited thereto. There may be two shock absorbing equipment mounted to both sides of each of the upper and lower half walls 33, 34. Accordingly, a total number of eight upper and lower dampers 21, 22 are installed at the same place.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A shock absorbing device having a shear wall structure with enhanced damping force for a building, the shock absorbing device configured to be installed between an upper beam and a lower beam, an upper half wall extending down from the upper beam, a lower half wall extending up from the lower beam, and the shock absorbing device comprising:

a longitudinal steel plate shear transmission rod extending between the upper beam and the lower beam, configured to swing leftward and rightward across the upper half wall and the lower half wall, and having
an upper end;
a lower end;
a first pivoting portion pivotally connected with the upper half wall; and
a second pivoting portion pivotally connected with the lower half wall;

two upper dampers mounted horizontally on the upper half wall and disposed adjacent to the upper beam, wherein
the upper end of the longitudinal transmission rod is disposed between the two upper dampers,
each of the upper dampers has two opposite ends, and one of the ends of each of the upper dampers is connected to the upper half wall at a position that is proximate to an intersection of the upper beam and an adjacent column that is spaced apart from the upper half wall and the lower half wall and connects the upper beam and the lower beam and a second of the ends of each of the upper dampers is connected to the upper end of the longitudinal transmission rod; and two lower dampers mounted horizontally on the lower half wall and disposed adjacent to the lower beam, wherein
the lower end of the longitudinal transmission rod is disposed between the two lower dampers; and
each of the lower dampers has two opposite ends, and one of the ends of each of the lower dampers is connected to the lower half wall at a position that is proximate to an intersection of the lower beam and an adjacent column that is spaced apart from the upper half wall and the lower half wall and connects the upper beam and the lower beam and a second of the ends of each of the lower dampers is connected to the lower end of the longitudinal transmission rod.

2. The shock absorbing device as claimed in claim 1, wherein each of the upper and lower dampers is an oil damper or a viscoelastic damper.

3. The shock absorbing device as claimed in claim 1, wherein the two upper dampers are mounted on a same side of the upper half wall.

4. The shock absorbing device as claimed in claim 3, wherein each of the upper and lower dampers is an oil damper or a viscoelastic damper.

5. The shock absorbing device as claimed in claim 1, wherein the two lower dampers are mounted on a same side of the lower half wall.

6. The shock absorbing device as claimed in claim 5, wherein each of the upper and lower dampers is an oil damper or a viscoelastic damper.

7. A shock absorbing system comprising two said shock absorbing devices as claimed in claim 1, wherein
   a first of the two shock absorbing devices is installed on a first side surface of the upper half wall and a first side surface of the lower half wall with the two upper dampers of said first shock absorbing device placed on the first side surface of the upper half wall and the two lower dampers of said first shock absorbing device placed on the first side surface of the lower half wall, and the first side surface of the lower half wall and the first side surface of the upper half wall face toward a same direction; and
   a second of the two shock absorbing devices is installed on a second side surface of the upper half wall and a second side surface of the lower half wall with the two upper dampers of said second shock absorbing device placed on the second side surface of the upper half wall and the two lower dampers of said second shock absorbing device placed on the second side surface of the lower half wall, and the second side surface of the lower half wall and the second side surface of the upper half wall face toward a same direction.

\* \* \* \* \*